(12) United States Patent
Takaki et al.

(10) Patent No.: US 12,312,767 B2
(45) Date of Patent: May 27, 2025

(54) WORK VEHICLE

(71) Applicant: Kubota Corporation, Osaka (JP)

(72) Inventors: Satoshi Takaki, Sakai (JP); Takahiro Usami, Sakai (JP); Junichi Murakami, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 340 days.

(21) Appl. No.: 17/994,392

(22) Filed: Nov. 28, 2022

(65) Prior Publication Data
US 2023/0250612 A1    Aug. 10, 2023

(30) Foreign Application Priority Data

Feb. 8, 2022   (JP) .................... 2022-018064

(51) Int. Cl.
*E02F 9/08*    (2006.01)

(52) U.S. Cl.
CPC .................... *E02F 9/0866* (2013.01)

(58) Field of Classification Search
CPC ...... E02F 9/0866; E02F 9/2025; E02F 3/3405
USPC ........................................................ 180/309
See application file for complete search history.

(56) References Cited

U.S. PATENT DOCUMENTS

| | | | | |
|---|---|---|---|---|
| 5,551,826 A | * | 9/1996 | Todd | B62D 33/067 296/190.07 |
| 5,918,694 A | * | 7/1999 | Miller | E02F 9/2004 180/328 |
| 5,941,330 A | * | 8/1999 | Miller | E02F 9/166 180/328 |
| 6,543,563 B1 | * | 4/2003 | Muraro | E02F 9/2275 180/89.12 |
| 6,854,546 B2 | * | 2/2005 | Beckstrom | B62D 33/067 180/89.13 |
| 6,860,707 B2 | * | 3/2005 | Roan | E02F 3/3405 37/468 |
| 6,910,731 B2 | * | 6/2005 | Albright | B62D 33/071 296/190.05 |

(Continued)

FOREIGN PATENT DOCUMENTS

JP    5314177 B2    10/2012

OTHER PUBLICATIONS

Japanese Office Action for corresponding JP Application No. 2022-018064, Feb. 18, 2025 (w/ machine translation).

(Continued)

*Primary Examiner* — Hau V Phan
(74) *Attorney, Agent, or Firm* — MORI & WARD, LLP

(57) ABSTRACT

A work vehicle includes a vehicle body frame having a vehicle body front part and a vehicle body rear part, and a cab frame connected to the vehicle body frame and being rotatable about a rotational shaft provided on the vehicle body rear part to be mounted on the vehicle body front part when the cab frame is in a closed state and to be separated from the vehicle body front part when the cab frame is in an open state. The vehicle body rear part has a support frame supporting the rotational shaft and includes a contact plate configured to abut against the cab frame in the closed state, and an engine room to be exposed between the vehicle body front part and the cab frame in the open state. The cab frame has a seal rubber configured to abut against the contact plate in the closed state.

12 Claims, 10 Drawing Sheets

(56) References Cited

U.S. PATENT DOCUMENTS

| | | | |
|---|---|---|---|
| 7,264,435 B2* | 9/2007 | Layko | E02F 3/342 |
| | | | 414/917 |
| 7,588,287 B2* | 9/2009 | Case | B60N 2/24 |
| | | | 296/190.08 |
| 7,946,370 B2* | 5/2011 | Albright | B62D 33/067 |
| | | | 296/190.07 |
| 9,938,687 B1* | 4/2018 | Eckrote | E02F 9/2033 |
| 10,000,244 B2* | 6/2018 | Knutson | B62D 33/0617 |
| 10,308,108 B2* | 6/2019 | Honda | E02F 9/0883 |
| 10,538,279 B2* | 1/2020 | Hellholm | B62D 55/06 |
| 2005/0264038 A1* | 12/2005 | Albright | E02F 9/166 |
| | | | 296/190.05 |
| 2009/0195022 A1* | 8/2009 | Bell | B62D 33/067 |
| | | | 296/190.06 |
| 2018/0179733 A1* | 6/2018 | Pitts | E02F 9/2025 |
| 2020/0071905 A1* | 3/2020 | Lee | E02F 3/3405 |

OTHER PUBLICATIONS

Decision to Grant a Patent for corresponding JP Application No. 2022-018064, Apr. 1, 2025 (w/ machine translation).

* cited by examiner

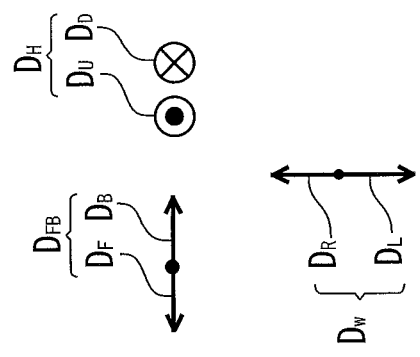
FIG. 2
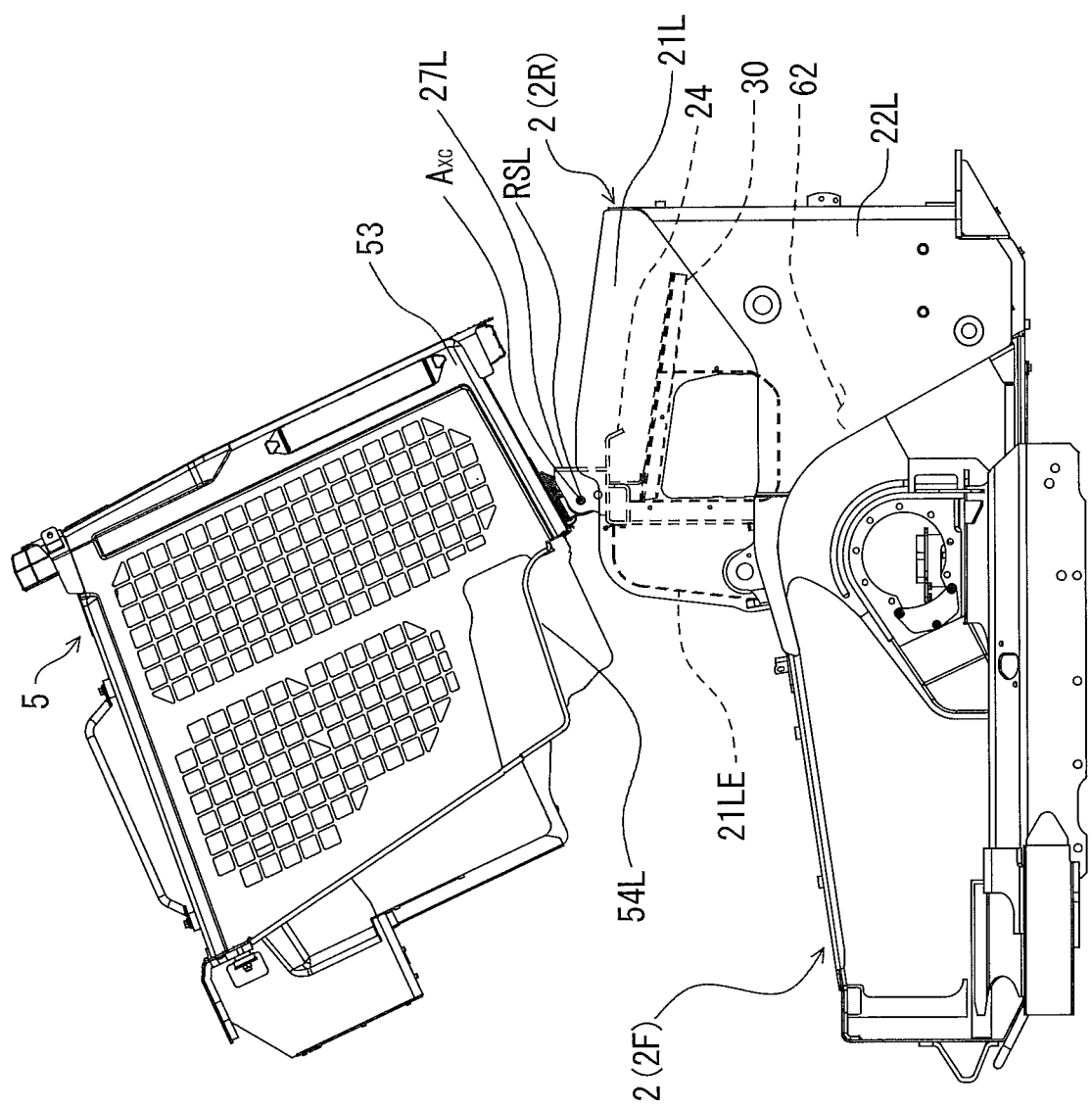

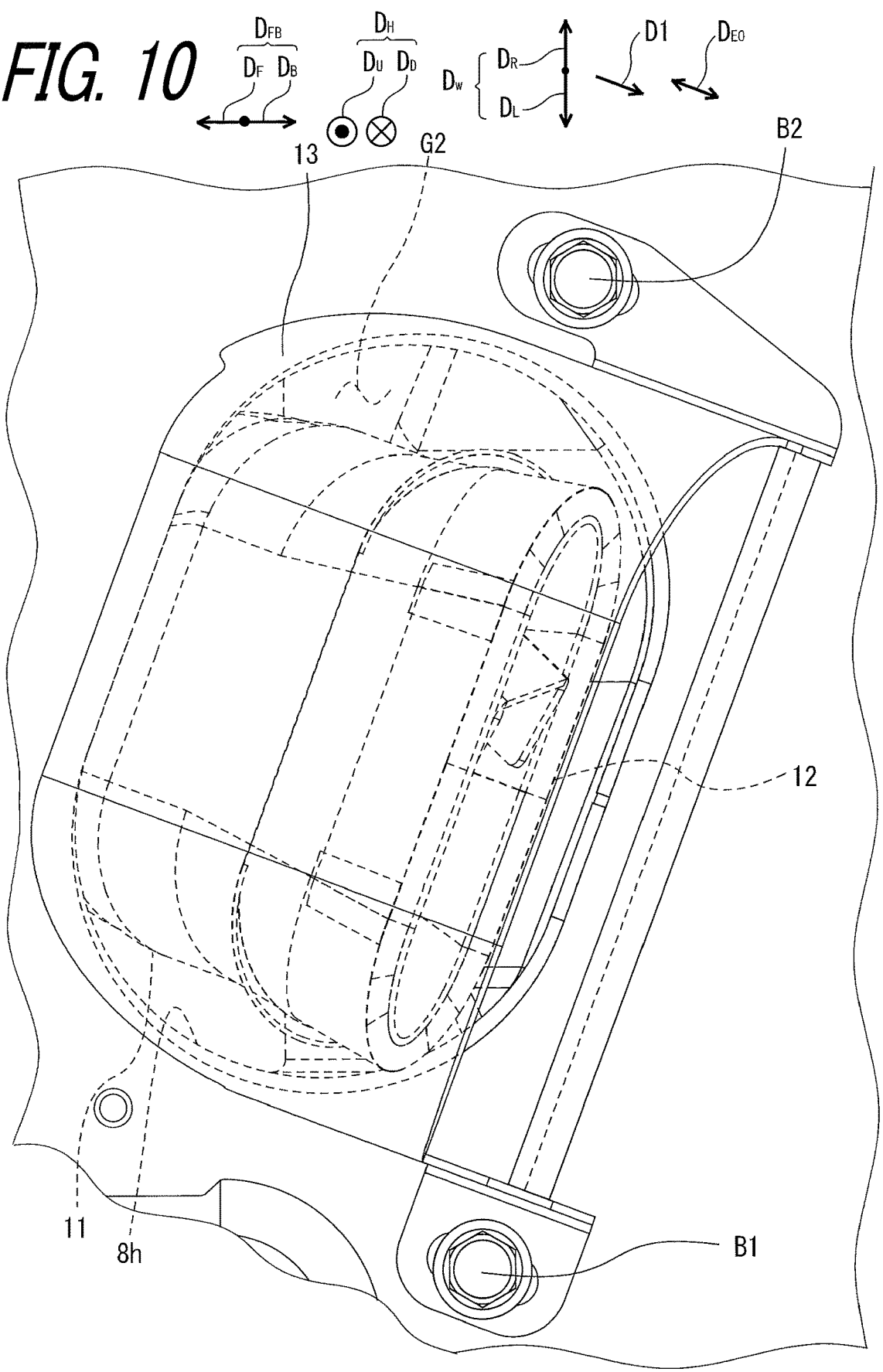

WORK VEHICLE

CROSS-REFERENCE TO RELATED APPLICATIONS

The present application claims priority under 35 U.S.C. § 119 to Japanese Patent Application No. 2022-018064, filed Feb. 8, 2022. The contents of this application are incorporated herein by reference in their entirety.

BACKGROUND OF THE INVENTION

Field of the Invention

The present invention relates to a work vehicle.

Discussion of The Background

Japanese Patent No. 5314177 discloses a work vehicle having a cabin that can be opened and closed.

SUMMARY OF THE INVENTION

According to one aspect of the present invention, a work vehicle includes a vehicle body frame having a vehicle body front part and a vehicle body rear part opposite to the vehicle body front part, and a cab frame connected to the vehicle body frame and being rotatable about a rotational shaft provided on the vehicle body rear part to be in a state switchable between a closed state and an open state, the cab frame being mounted on the vehicle body front part when the cab frame is in the closed state, the cab frame being separated from the vehicle body front part when the cab frame is in the open state. A vehicle body rear part includes a support frame and an engine room. The support frame supports a rotational shaft. The engine room is provided below the support frame in a height direction along a height of the vehicle body frame. The engine room is exposed between the vehicle body front part and the cab frame when the cab frame is in the open state. The cab frame includes a seal rubber configured to abut against the contact plate when the cab frame is in the closed state.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

FIG. 2 is a side view of the work vehicle when the cabin is rotated.

FIG. 10 is an enlarged view of an upper portion of an exhaust port and a muffler cover.

DESCRIPTION OF THE EMBODIMENTS

Figure 1:
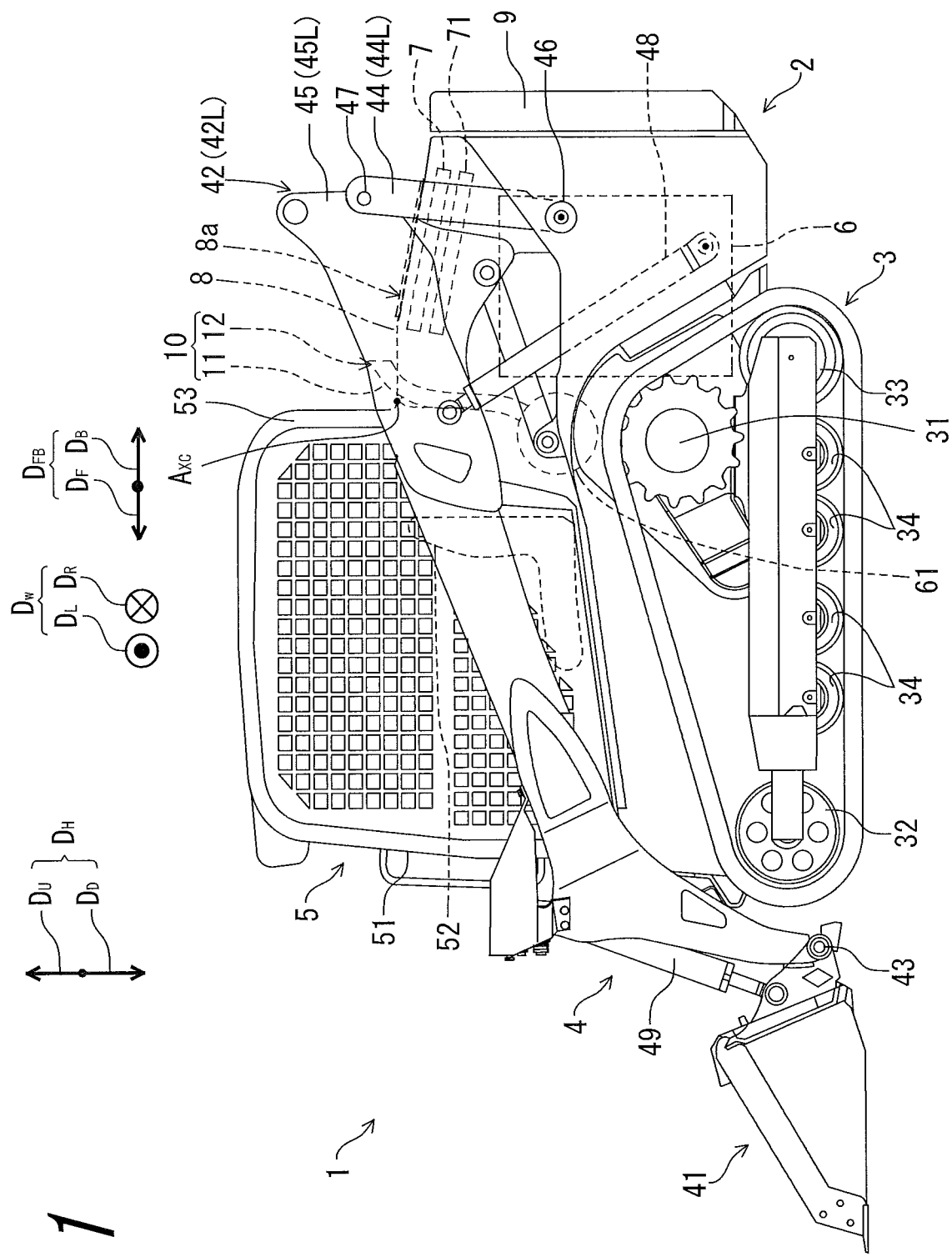
FIG. 1 is a side view of a work vehicle.

Hereinafter, the present invention will be described in detail with reference to drawings showing embodiments thereof. In the drawings, the same reference numerals indicate corresponding or substantially identical configurations.

Exemplary Embodiment

<Overall Configuration>

Referring to FIGS. 1 to 4, a work vehicle 1, such as a compact truck loader, includes an exhaust system 10. A work vehicle 1 includes a vehicle body frame 2, a traveling device 3, a working device 4, and a cabin 5. The vehicle body frame 2 supports the traveling device 3, the working device 4, and the cabin 5. In the illustrated embodiment, the traveling device 3 is a crawler type traveling device. Therefore, the traveling device 3 includes the drive wheels 31, the driven wheels 32 and 33, and the rolling wheels 34. However, the traveling device 3 is not limited to a crawler type traveling device. The vehicle body frame 2 has a vehicle body front part 2F and a vehicle body rear part 2R opposite to the vehicle body front part 2F. The traveling device 3 may be, for example, a front wheel/rear wheel traveling device, or a traveling device having a front wheel and a rear crawler. A working device 4 includes work equipment (bucket) 41 at the distal end of working device 4. A proximal end of the working device 4 is attached to the vehicle body rear part 2R of the vehicle body frame 2. The working device 4 includes a pair of arm assemblies 42 for rotatably supporting the bucket 41 via the bucket pivot shaft 43. Each of the pair of arm assemblies 42 includes a lift link 44 and an arm 45.

The lift link 44 is rotatable with respect to the vehicle body frame 2 around a fulcrum shaft 46. The arm 45 is rotatable with respect to the lift link 44 about a joint shaft 47. The working device 4 further includes a plurality of arm cylinders 48 and at least one equipment cylinder 49. Each of the plurality of arm cylinders 48 is rotatably connected to the vehicle body frame 2 and the arm 45, and moves the lift link 44 and the arm 45 to raise and lower the bucket 41. At least one equipment cylinder 49 is configured to tilt the bucket 41.

Figure 3:
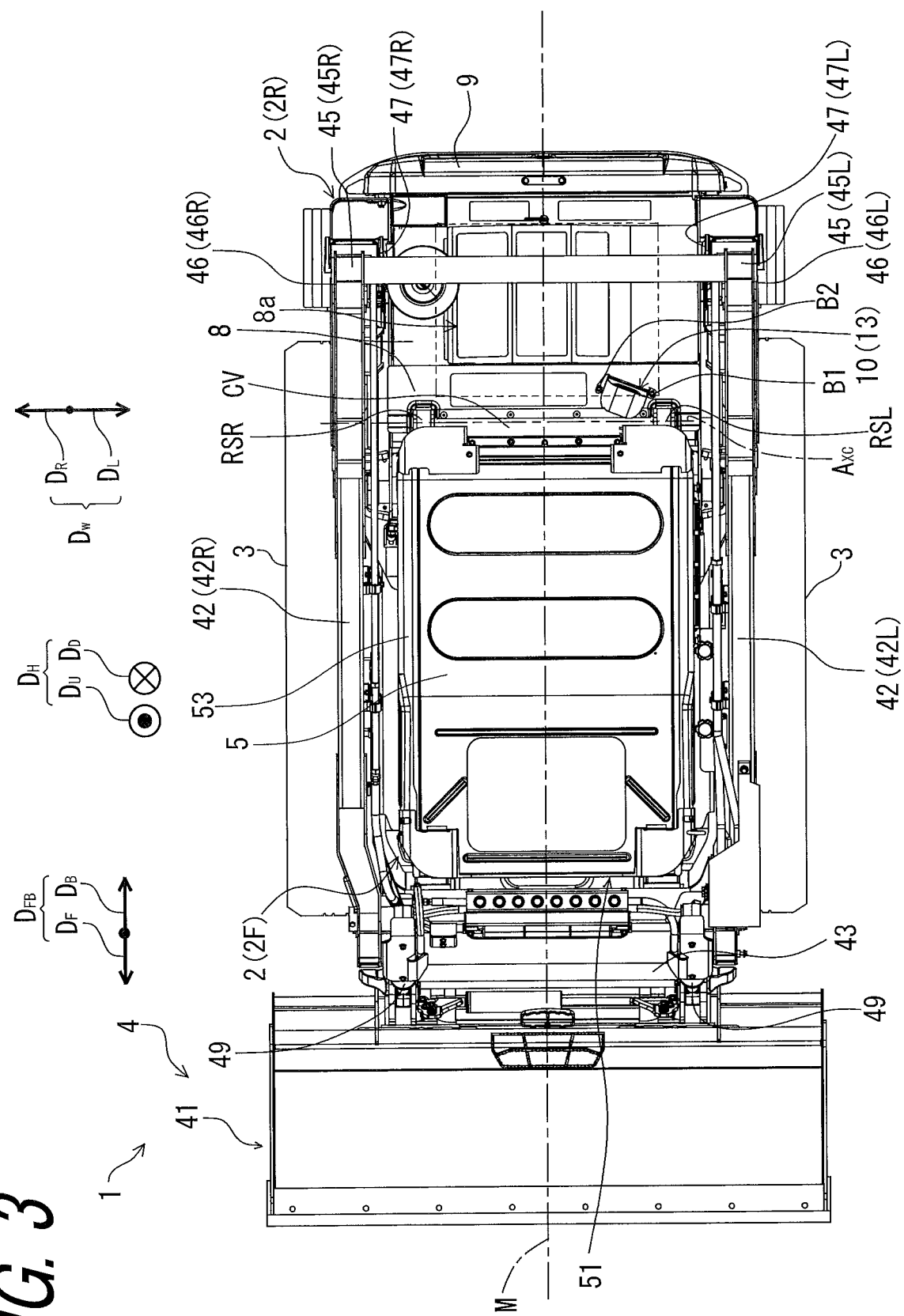
FIG. 3 is a top view of a work vehicle.

The cabin 5 is attached to a vehicle body front part 2F of the vehicle body frame 2. A work vehicle 1 includes a front door 51 in front of a cabin 5, and a driver's seat 52 and an operating device (not illustrated) provided in the cabin 5. An internal space of the cabin 5 is defined by a cab frame 53. As shown in FIG. 2 and FIG. 3, the cab frame 53 is connected to the vehicle body frame 2 and is rotatable about rotational shafts RSL and RSR provided on the vehicle body frame 2. In FIG. 2, in order to clarify the structure of the vehicle body frame 2, illustration is omitted except for the vehicle body frame 2, the cabin 5, and a seal mechanism 20 to be described later. In FIGS. 1 to 3, a common rotational axis $A_{XC}$ defined by the rotational shafts RSL and RSR is illustrated. Referring to FIGS. 1 and 2, the cab frame 53 is in a state switchable between a closed state (see FIG. 1) in which the cab frame 53 is mounted on the vehicle body front part 2F and an open state (see FIG. 2) in which the cab frame 53 is separated from the vehicle body front part 2F by turning around the rotational shafts RSL and RSR.

In the embodiment according to the present the embodiment according to the present application, the longitudinal direction $D_{FB}$ (forward $D_F$/rearward $D_B$) means a front/rear direction as seen from an operator sitting on the driver's seat 52 of the cabin 5. Left direction $D_L$, right direction $D_R$, width direction $D_W$ mean "left direction," "right direction," and "left/right direction" respectively when viewed from the operator. Up direction $D_U$, down direction $D_D$; height direction $D_{HT}$ mean an upward direction, a downward direction and a height direction as seen from the operator. The front/back, left/right (width), up/down (height), directions of the work vehicle 1 correspond to the front/back, left/right (width), up/down (height) directions as viewed from the operator.

Figure 4:
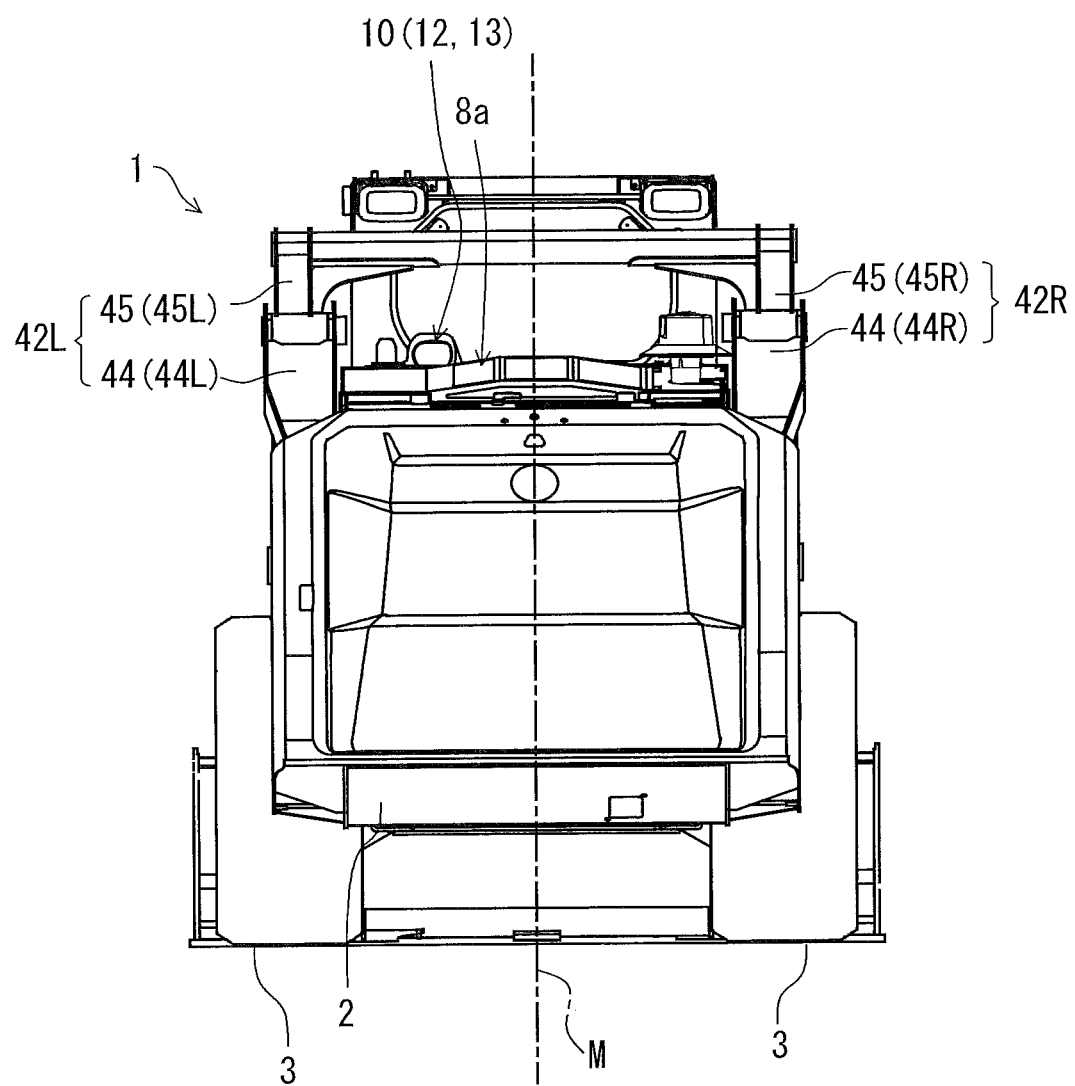
FIG. 4 is a rear view of a work vehicle.

In FIG. 3, one of the pair of arm assemblies 42 is provided on the left side of the cabin 5. The other of the pair of arm assemblies 42 is provided on the right side of the cabin 5. More specifically, one of the arm cylinders 48 and one of the arms 45 are provided on the left side of the cabin 5. The other arm cylinder 48 and the other arm 45 are provided on the right side of the cabin 5. FIG. 1 shows the left side of the work vehicle 1. As shown in FIGS. 3 and 4, the vehicle body frame 2 is substantially symmetrical with respect to the vehicle body center plane M, and among the pair of arm assemblies 42, the arm assembly 42 provided on the left side with respect to the vehicle body center plane M is shown as a first arm assembly 42L, and the arm assembly 42 provided on the right side with respect to the vehicle body center plane M is shown as a second arm assembly 42R. The lift link 44 provided on the left side with respect to the vehicle body center plane M is shown as a first lift link 44L, and the lift link 44 provided on the right side with respect to the vehicle body center plane M is shown as a second lift link 44R. The arm 45 provided on the left side with respect to the vehicle body center plane M is shown as a first arm 45L, and the arm 45 provided on the right side with respect to the vehicle body center plane M is shown as a second arm 45R. The fulcrum shaft 46 provided on the left side with respect to the vehicle body center plane M is shown as the first fulcrum shaft 46L, the fulcrum shaft 46 provided on the right side of the vehicle body center plane M is shown as a second fulcrum shaft 46R. A joint shaft 47 provided on the left side with respect to the vehicle body center plane M is shown as a first joint shaft 47L, and a joint shaft 47 provided on the right side with respect to the vehicle body center plane M is shown as a second joint shaft 47R.

Referring to FIG. 1, the work vehicle 1 further includes an engine 6 and a heat exchanger 7 provided at the vehicle body rear part 2R of the vehicle body frame 2. The engine 6 is configured to provide driving force to the traveling device 3 and the working device 4. The heat exchanger 7 includes a radiator for cooling the refrigerant of the engine 6. Further, preferably, the heat exchanger 7 includes an oil cooler configured to cool hydraulic fluid used in the hydraulic system of the work vehicle 1 (e.g., arm cylinder 48 and at least one equipment cylinder 49). The work vehicle 1 includes a fan 71 for air-cooling the heat exchanger 7. The engine 6 and the heat exchanger 7 are provided between a pair of arm assemblies 42 in the width direction $D_W$ of the work vehicle 1.

The work vehicle 1 is further provided with a bonnet cover 8 for covering the heat exchanger 7. The bonnet cover 8 further covers the engine 6. An air suction port 8a for taking air into the inside of the cover 8 is provided on the upper surface of the bonnet cover 8. The work vehicle 1 further includes a rear bonnet cover 9 provided at the rear end of the vehicle body frame 2. The rear bonnet cover 9 is operable and closable such that a maintenance worker can perform maintenance work on the engine 6 and the like.

An exhaust system 10 includes an exhaust pipe 11, one end of which is connected to an engine 6, and an exhaust port 12 connected to the exhaust pipe 11. More specifically, the exhaust pipe 11 is connected to the engine 6 via an exhaust treatment device 61 configured to treat the exhaust of the engine 6. The exhaust treatment device 61 includes, for example, a particulate removal filter. However, the exhaust treatment device 61 may include a selective reduction catalyst device. Referring to FIG. 3, the exhaust system 10 is provided near the middle between the first arm assembly 42L and the vehicle body center plane M in the width direction $D_W$ of the work vehicle 1.

FIG. 4 is a view of a part of the work vehicle 1 as viewed from the front end of the work vehicle 1 toward the rear $D_B$. FIG. 4 illustrates, a vehicle body frame 2, an engine 6, an exhaust treatment device 61, an exhaust system 10, heat exchanger 7, fan 71, and hood cover 8, and other than those parts are not shown. Referring to FIG. 4, the vehicle body frame 2 (vehicle body rear part 2R) has a first inner wall 21L, a second inner wall 21R, a first outer wall 22L, a second outer wall 22R, a first rear wall 23L, a second rear wall 23R, a support frame 24, a bottom wall 25, a first track frame 28L, a second track frame 28R, a first mounting frame 29L, and a second mounting frame 29R.

The first inner wall 21L and the second inner wall 21R connects the support frame 24 to the bottom wall 25 and extends in the height direction $D_H$. The first outer wall 22L faces the first inner wall 21L in the width direction $D_W$ and extends in the height direction $D_H$. The second outer wall 22R faces the second inner wall 21R in the width direction $D_W$ and extends in the height direction $D_H$. The first inner wall 21L and the first outer wall 22L are located on the left side with respect to the vehicle body center plane M. The second inner wall 21R and the second outer wall 22R are located on the right side with respect to the vehicle body center plane M. The first inner wall 21L is positioned between the first outer wall 22L and the vehicle body center plane M in the width direction $D_W$. The second inner wall 21R is located between the second outer wall 22R and the vehicle body center plane M in the width direction $D_W$. The first rear wall 23L connects the rear end of the first inner wall 21L and the rear end of the first outer wall 22L. The second rear wall 23R connects the rear end of the second inner wall 21R and the rear end of the second outer wall 22R. The bottom wall 25 connects the lower end of the first inner wall 21L and the lower end of the second inner wall 21R. The support frame 24 connects the upper end of the first inner wall 21L and the upper end of the second inner wall 21R. The support frame 24 is opposed to the bottom wall 25 in the height direction $D_H$. The support frame 24 has a first support portion 27L for rotatably supporting the rotational shaft RSL and a second support portion 27R for rotatably supporting the rotational shaft RSR.

The first lift link 44L, the first arm assembly 42L, and the arm cylinder 48 that operates the first arm assembly 42L are provided between the first inner wall 21L and the first outer wall 22L in the with direction $D_W$. A first fulcrum shaft 46L supporting the first lift link 44L is connected to the first inner wall 21L and the first outer wall 22L. The second lift link 44R, the second arm assembly 42R, and the arm cylinder 48 for operating the second arm assembly 42R are provided between the second inner wall 21R and the second outer wall 22R in the width direction $D_W$. A second fulcrum shaft 46R supporting the second lift link 44R is connected to the second inner wall 21R and the first outer wall 22L.

The first track frame 28L is attached to the lower end of the first inner wall 21L via a first mounting frame 29L. The second track frame 28R is attached to the lower end of the second inner wall 21R via a second mounting frame 29R. Driven wheels 32 and 33 and rolling wheels 34 are rotatably attached to the first track frame 28L and the second track frame 28R. The drive wheel 31 is supported by the first inner wall 21L and the second inner wall 21R. The engine 6 is supported by the bottom wall 25 through a damper (not illustrated). In FIG. 4, in order to define the direction of the engine 6, a crankshaft $A_{XE}$ of the engine 6 is illustrated. The crankshaft $A_{XE}$ extends substantially in the longitudinal direction $D_{FB}$ on the vehicle body center plane M.

Figure 5:
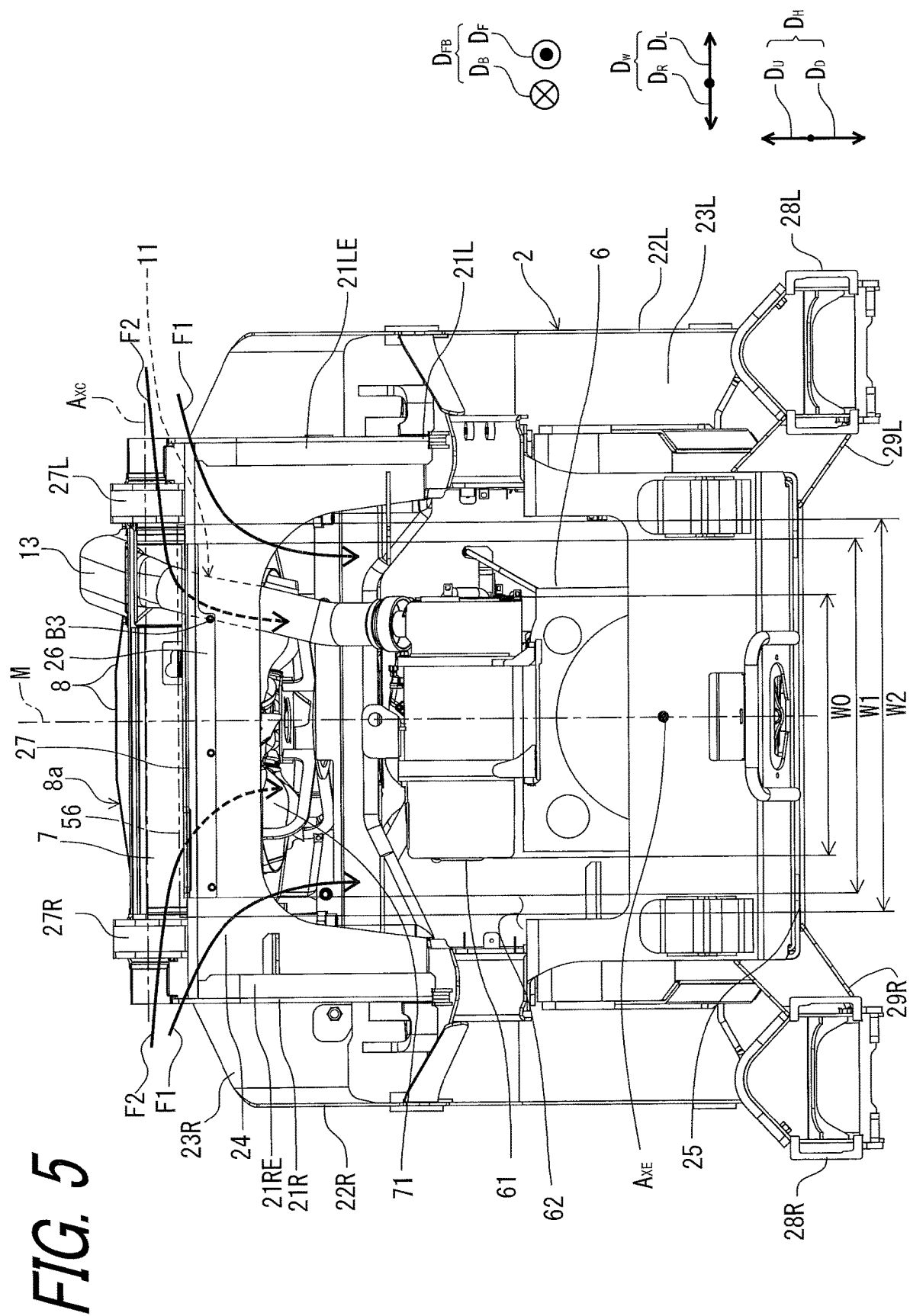
FIG. 5 is a view of a part of the work vehicle as viewed from the front end of the work vehicle toward the rear.
Figure 6:
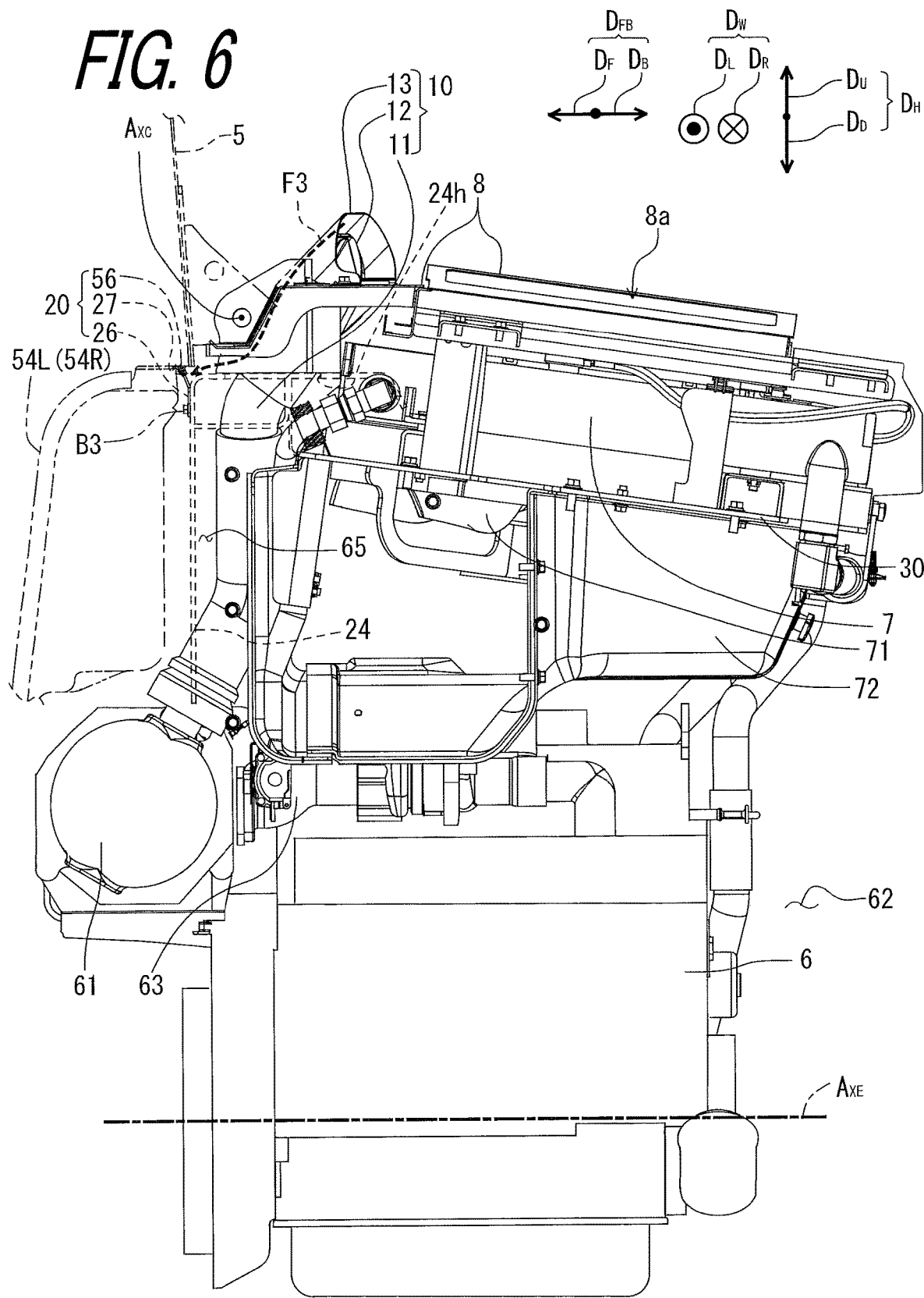
FIG. 6 is a side view of the periphery of the engine.

FIG. 6 is a view of the periphery of the engine 6 shown in FIG. 5 as viewed from the side. In FIG. 6, the display of the vehicle body frame 2 excluding the support frame 24 is omitted. In addition, the structure of the engine 6 is shown schematically, and a part of the structure of the engine 6 is not illustrated. As shown in FIG. 6, the heat exchanger 7, the fan 71, and the bonnet cover 8 are attached to the first inner wall 21L and the second inner wall 21R via the stay 30. That is, the bonnet cover 8 is provided on the vehicle body frame 2 in the height direction $D_H$ along the height of the vehicle body frame 2. The support frame 24 is shown in dotted lines. Referring to FIGS. 2, 5, and 6, the support frame 24 has an L shape bent downward at its front end. The support frame 24 has a through-hole 24h, and the exhaust pipe 11 is disposed to pass through the through-hole 24h.

Further, referring to FIGS. 5 and 6, the fan 71 is located in the upper portion $D_U$ of the engine. The heat exchanger 7 is located above $D_U$ of the fan 71. The bonnet cover 8 having the air suction port 8a is located in the upper portion $D_U$ of the heat exchanger 7. As the fan 71 rotates, air is sent from the air suction port 8a to the heat exchanger 7. A fan duct 72 is provided between the fan 71 and the engine 6, and the fan duct 72 prevents the air heated through the heat exchanger 7 from flowing into the engine room 62. The fan duct 72 also prevents outside air containing dust from flowing into the engine room 62. In FIGS. 5 and 6, the fan 71 is illustrated because a part of the fan duct 72 is omitted illustrating, but actually the fan 71 is not exposed to the engine room 62 because it is covered with the fan duct 72. The engine room 62 is a space surrounded by the cabin 5, the fan duct 72, the first inner wall 21L, the second inner wall 21R, the bottom wall 25, and the rear bonnet cover 9. That is, it can be said that the bonnet cover 8 covers the engine room 62, and the vehicle body rear part 2R has the engine room 62 below the support frame 24 in the height direction $D_H$ along the height of the vehicle body frame 2. When the open state is reached as shown in FIG. 2, the lower portion of the support frame 24 shown in FIG. 5 is exposed to the outside. That is, in the open state, the engine room 62 is exposed between the vehicle body front part 2F and the cab frame 53. The engine 6 and the exhaust treatment device 61 are provided in an engine room 62.

The exhaust treatment device 61 is provided forward $D_F$ of the engine 6 in the engine room 62, and is connected to the engine 6 by a connection pipe 63. The connection pipe 63 is connected at the right end of the exhaust treatment device 61. As shown in FIG. 5, the air supply port of the exhaust pipe 11 is connected to the left end of the exhaust treatment device 61. An exhaust port 12 is provided on the side of the exhaust pipe 11 opposite to the air supply port. The exhaust port 12 is fixed to the exhaust pipe 11 by press-fitting, adhesive, welding, or the like. That is, the exhaust pipe 11 has the exhaust port 12. As shown in FIGS. 5 and 6, the exhaust port 12 is protected by being covered with a muffler cover 13. That is, the exhaust system 10 includes the muffler cover 13. The muffler cover 13 is fixed to the bonnet cover 8 by bolts B1, B2, etc. As shown in FIGS. 3 and 6, the exhaust port 12 faces the air suction port 8a.

Referring to FIGS. 5 and 6, a work vehicle 1 includes a seal mechanism 20. The seal mechanism 20 has a contact plate 26 and a seal rubber 56. The contact plate 26 is a part of the support frame 24. The seal rubber 56 is a part of the cab frame 53. In FIGS. 5 and 6, the configuration belonging to the cabin 5 is illustrated by a two-dot chain line. The contact plate 26 is configured to abut against the cab frame 53 when the cab frame 53 is in the closed state. The contact plate 26 is attached to the remaining frame of the support frame 24 via a plurality of bolts B3. The seal rubber 56 is configured to abut against the contact plate 26 when cab frame 53 is in the closed state. Referring to FIG. 5, the exhaust treatment device 61 extends in the width direction $D_W$ along the central axis $A_{XC}$ of the rotational shafts RSL and RSR. The seal rubber 56 and the contact plate 26 extend in the width direction $D_W$. The exhaust treatment device 61 is located below the seal rubber 56 and the contact plate 26 in the height direction $D_H$. The length W1 of the seal rubber 56 in the width direction $D_W$ and the length W2 of the contact plate 26 in the width direction $D_W$ are longer than the length $W_O$ of the exhaust treatment device 61 in the width direction $D_W$.

Figure 7:
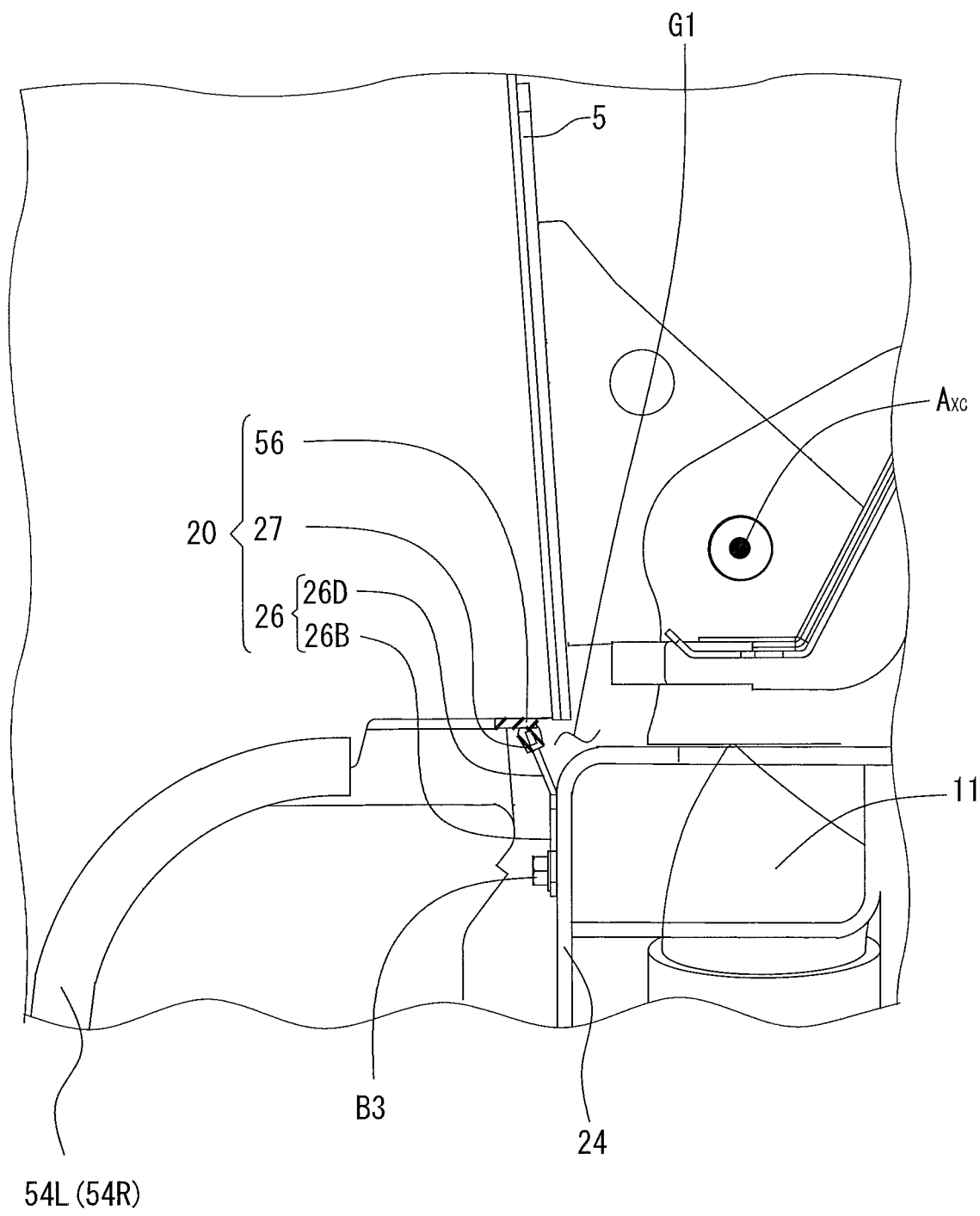
FIG. 7 is an enlarged view of the vicinity of the sealing mechanism of FIG. 6.
Figure 8:
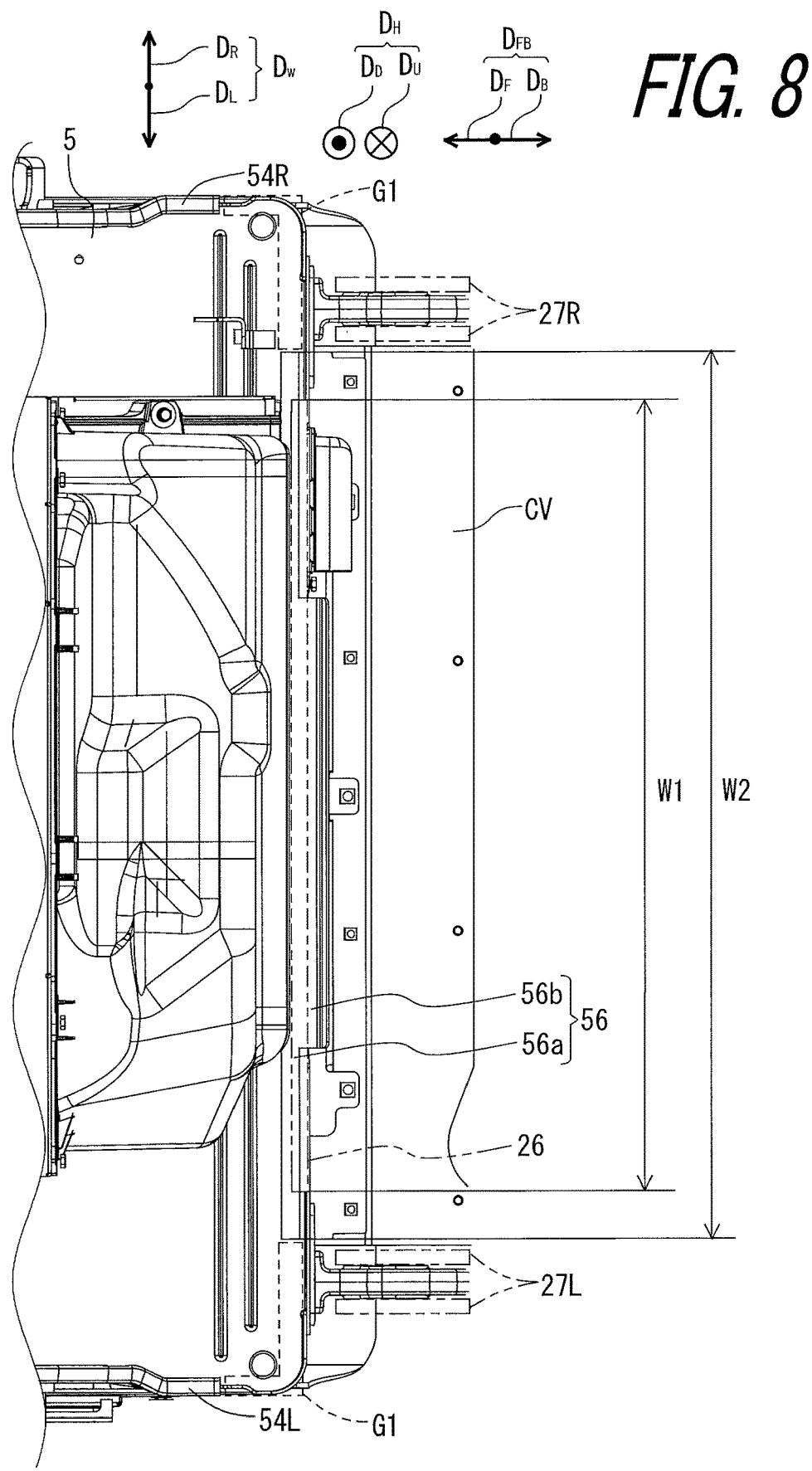
FIG. 8 is a bottom view of the cabin.

FIG. 7 is an enlarged view of the vicinity of the seal mechanism 20 shown in FIG. 6. The contact plate 26 has a base end portion 26B to which the bolt B3 is attached and which extends in the height direction $D_H$, and a distal end portion 26D inclined in the forward direction from the height direction $D_H$. Thereby, the contact plate 26 can be easily attached to the remaining frame of the support frame 24, and can be easily contacted with the seal rubber 56. Also the seal mechanism 20 includes an elastic body 27 provided at the distal end portion 26D. Thus, it is possible to prevent the seal rubber 56 from being damaged by the contact with the contact plate 26. FIG. 8 is a bottom view of the cabin 5. In FIG. 8, the contact plate 26, the first support portion 27L, and the second support portion 27R are shown by two-dot chain lines. Referring to FIG. 8, the seal rubber 56 includes a base end portion 56a configured to abut against the contact plate 26 and an extended portion 56b extending from the base end portion 26a to the rear $D_B$. By providing the extended portion 56b, the contact area of the seal rubber 56 with the cab frame 53 is increased so that the seal rubber 56 is less likely to come off from the cab frame 53.

Figure 9:
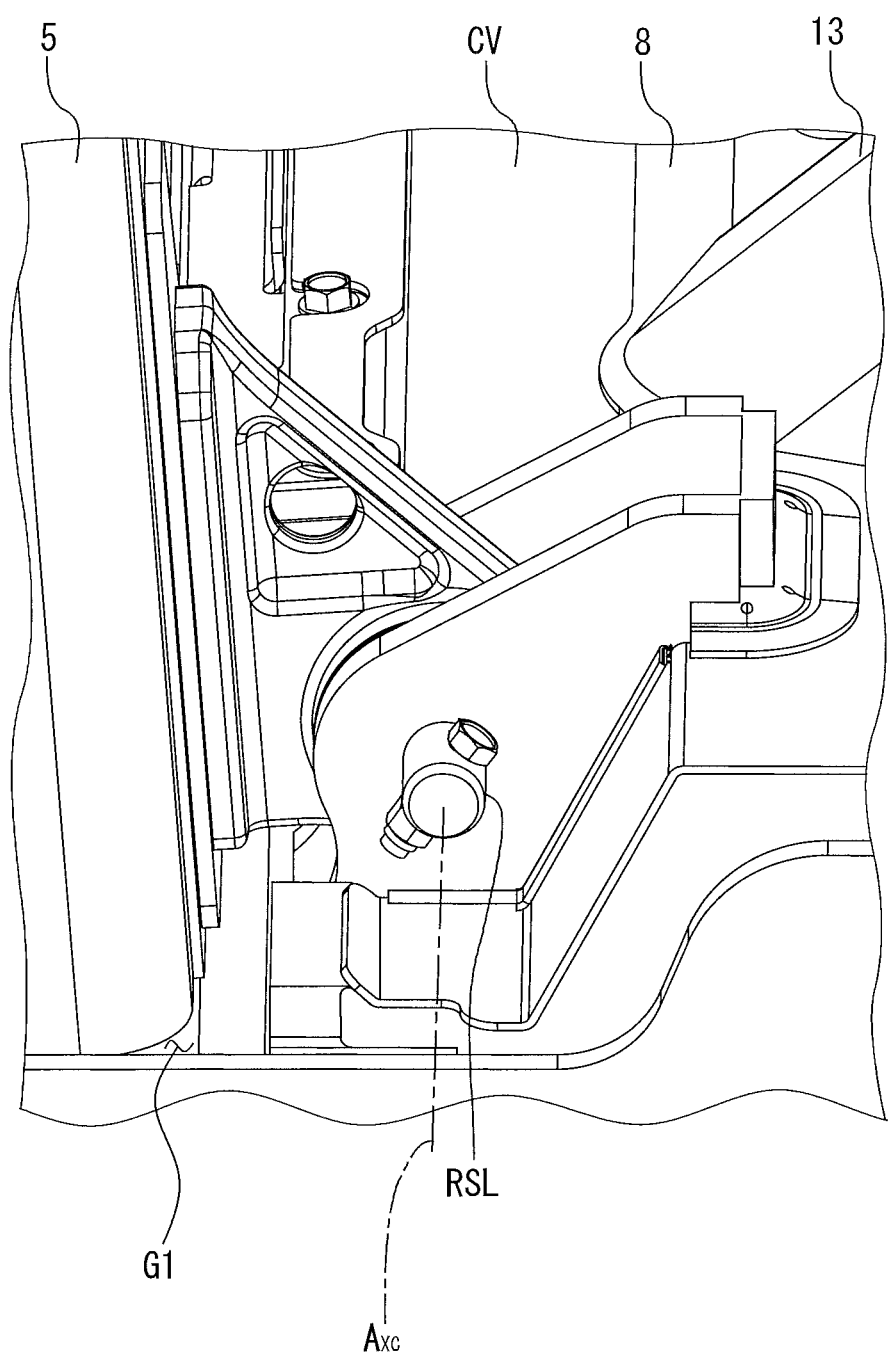
FIG. 9 is an enlarged view of a boundary portion between the cabin and the bonnet cover.

FIG. 9 is an enlarged view of a boundary portion between a cabin 5 and a bonnet cover 8. Referring to FIG. 9, in the work vehicle 1, a first gap G1 is provided between the vehicle body frame 2 and the cab frame 53 above the seal rubber 56 and the contact plate 26 in the height direction $D_H$. When the cabin 5 is rotated, the operator can lift the cabin 5 by putting his hand into the first gap G1. Referring to FIGS. 3, 8, and 9, the work vehicle 1 includes a cover CV that closes a gap between the cabin 5 and the bonnet cover 8 between the first support portion 27L and the second support portion 27R. The cover CV is made of cloth and is bent when the cabin 5 is rotated. Referring to FIGS. 2 and 6-8, the cabin 5 has outer circumferential seals 54L, 54R on the outer circumference of the bottom thereof. In the closed state, the outer peripheral seals 54L and 54R are to abut against the extension portions 21LE and 21RE extending from the first inner wall 21L and the second inner wall 21R of FIG. 5 to the inside of the vehicle body. Therefore, the first gap G1 is provided in a region surrounded by a dotted line in FIG. 8. The outside air entering into the first gap G1 reaches the seal rubber 56 and the contact plate 26. The length W1 of the seal rubber 56 in the width direction $D_W$ and the length W2 of the contact plate 26 in the width direction $D_W$ are longer than the length $W_O$ of the exhaust treatment device 61 in the width direction $D_W$, so that dust from outside air hardly reaches the exhaust treatment device 61 positioned below the seal rubber 56 and the contact plate 26 in the height direction $D_H$. More specifically, as shown in the flow F1 of FIG. 5, dust from outside air falls, but as shown in the flow F2, dust toward the inside of the vehicle is dammed by the seal mechanism 20. As a result, it is possible to reduce the risk of the dust being burned by the exhaust treatment device 61 which generates high heat.

FIG. 10 is an enlarged view of an upper portion of the exhaust port 12 and the muffler cover 13 shown in FIG. 6. Referring to FIG. 10, the exhaust port 12 has a long hole pipe shape. The bonnet cover 8 has an opening 8h. Referring to FIGS. 6 and 10, the exhaust pipe 11 (exhaust port 12) communicates with the outside of the work vehicle 1 through the opening 8h. A part of the exhaust port 12 may be disposed closer to the engine room 62 than the opening 8h. A second gap G2 is provided between the opening 8h and the exhaust pipe 11. As shown in FIG. 6, the opening 8h communicates with the engine room 62 through the through-hole 24h and the gap 65. However, as shown in the flow F3 shown in FIG. 6, the outside air entering from the second gap G2 reaches the seal rubber 56 and the contact plate 26. Therefore, at least part of the dust entering from the opening 8h is dammed up by the seal mechanism 20. As a result, it is possible to reduce the risk of the dust being burned by the exhaust treatment device 61 which generates high heat.

<Operation and Effect of the Embodiments>

In a work vehicle 1 according to the present embodiment, a support frame 24 has a contact plate 26 configured to abut against a cab frame 53 when the cab frame 53 is in a closed state. The cab frame 53 has a seal rubber 56 configured to abut against the contact plate 26 when the cab frame 53 is in the closed state. Thus, the work vehicle 1 can prevent dust from entering through the gap between the bonnet cover 8 and the cabin 5.

As used herein, "comprising" and its derivatives are non-limiting terms that describe the presence of a component, and do not exclude the presence of other components not described. This also applies to "having", "including" and their derivatives.

The terms "member," "part," "element," "body," and "structure" may have multiple meanings, such as a single part or multiple parts.

Ordinal numbers such as "first" and "second" are simply terms used to identify configurations and do not have other meanings (e.g., a particular order). For example, the presence of the "first element" does not imply the presence of the "second element", and the presence of the "second element" does not imply the presence of the "first element".

Terms such as "substantially", "about", and "approximately" indicating degrees can mean reasonable deviations such that the final result is not significantly altered, unless otherwise stated in the embodiments. All numerical values described herein may be interpreted to include words such as "substantially," "about," and "approximately."

In the present application, the phrase "at least one of A and B" should be interpreted to include only A, only B, and both A and B.

In view of the above disclosure, it will be apparent that various changes and modifications of the present invention are possible. Therefore, the present invention may be carried out by a method different from the specific disclosure of the present application without departing from the spirit of the present invention.

What is claimed is:

1. A work vehicle comprising:
a vehicle body frame including a vehicle body front part and a vehicle body rear part opposite to the vehicle body front part;
a cab frame connected to the vehicle body frame and being rotatable about a rotational shaft provided on the vehicle body rear part to be in a state switchable between a closed state and an open state, the cab frame being mounted on the vehicle body front part when the cab frame is in the closed state, the cab frame being separated from the vehicle body front part when the cab frame is in the open state;
the vehicle body rear part comprising:
a support frame supporting the rotational shaft and including a contact plate configured to abut against the cab frame when the cab frame is in the closed state; and
an engine room provided below the support frame in a height direction along a height of the vehicle body frame, the engine room being exposed between the vehicle body front part and the cab frame when the cab frame is in the open state;
an engine provided in the engine room;
an exhaust treatment device provided in the engine room to treat exhaust from the engine; and
the cab frame including a seal rubber configured to abut against the contact plate when the cab frame is in the closed state;
wherein
the exhaust treatment device extends in a width direction along a central axis of the rotational shaft,
the seal rubber and the contact plate extend in the width direction,
the exhaust treatment device is located below the seal rubber and the contact plate in the height direction, and
each of lengths of the seal rubber and the contact plate in the width direction are longer than a length of the exhaust treatment device in the width direction.

2. The work vehicle according to claim 1,
wherein a first gap is provided between the vehicle body frame and the cab frame above the seal rubber and the contact plate in the height direction, and
wherein outside air entering into the first gap reaches the seal rubber and the contact plate.

3. The work vehicle according to claim 2, further comprising:
a bonnet cover to cover the engine room; and
an exhaust pipe connected to the exhaust treatment device, wherein
the bonnet cover has an opening,
the exhaust pipe communicates with outside of the work vehicle through the opening,
a second gap is provided between the opening and the exhaust pipe, and
an outside air entering into the second gap reaches the seal rubber and the contact plate.

4. The work vehicle according to claim 3, wherein
the contact plate comprises
a base end portion extending in the height direction, and
a distal end portion extending in a direction inclined forward from the height direction.

5. The work vehicle according to claim 4, comprising:
an elastic body provided at a tip end of the distal end portion.

6. The work vehicle according to claim 2, wherein
the contact plate comprises
a base end portion extending in the height direction, and
a distal end portion extending in a direction inclined forward from the height direction.

7. The work vehicle according to claim 6, comprising:
an elastic body provided at a tip end of the distal end portion.

8. The work vehicle according to claim 1, further comprising:
a bonnet cover to cover the engine room; and
an exhaust pipe connected to the exhaust treatment device, wherein
the bonnet cover has an opening,
the exhaust pipe communicates with outside of the work vehicle through the opening,
a second gap is provided between the opening and the exhaust pipe, and
an outside air entering into the second gap reaches the seal rubber and the contact plate.

9. The work vehicle according to claim 8, wherein
the contact plate comprises
a base end portion extending in the height direction, and
a distal end portion extending in a direction inclined forward from the height direction.

10. The work vehicle according to claim 9, comprising:
an elastic body provided at a tip end of the distal end portion.

11. The work vehicle according to claim 1, wherein the contact plate comprises
a base end portion extending in the height direction, and
a distal end portion extending in a direction inclined forward from the height direction.

12. The work vehicle according to claim 11, comprising:
an elastic body provided at a tip end of the distal end portion.

* * * * *